US008549034B2

(12) United States Patent
Martini et al.

(10) Patent No.: US 8,549,034 B2
(45) Date of Patent: Oct. 1, 2013

(54) METHOD AND SYSTEM FOR ENABLING A USER TO GET INFORMATION ABOUT ENTITIES OF PREDEFINED CATEGORIES

(75) Inventors: Giovanni Martini, Turin (IT); Gabriele Elia, Turin (IT); Marco Marchetti, Turin (IT)

(73) Assignee: Telecom Italia S.p.A., Milan (IT)

( * ) Notice: Subject to any disclaimer, the term of this patent is extended or adjusted under 35 U.S.C. 154(b) by 56 days.

(21) Appl. No.: 12/990,450

(22) PCT Filed: Apr. 30, 2008

(86) PCT No.: PCT/EP2008/003509
§ 371 (c)(1),
(2), (4) Date: Jan. 7, 2011

(87) PCT Pub. No.: WO2009/132669
PCT Pub. Date: Nov. 5, 2009

(65) Prior Publication Data
US 2011/0113060 A1    May 12, 2011

(51) Int. Cl.
  *G06F 7/00*    (2006.01)
  *G06F 17/30*    (2006.01)
  *G06F 15/16*    (2006.01)

(52) U.S. Cl.
  USPC .......................................... 707/770; 705/319

(58) Field of Classification Search
  USPC ................................ 707/770, 769; 705/319
  See application file for complete search history.

(56) References Cited

U.S. PATENT DOCUMENTS

| | | | | |
|---|---|---|---|---|
| 5,941,947 | A * | 8/1999 | Brown et al. | 709/225 |
| 6,301,581 | B1 * | 10/2001 | Smiley | 707/769 |
| 7,647,330 | B2 * | 1/2010 | Rieffanaugh, Jr. | 707/770 |
| 2004/0181540 | A1 | 9/2004 | Jung et al. | |
| 2005/0171799 | A1 | 8/2005 | Hull et al. | |
| 2009/0089177 | A1 * | 4/2009 | Dayton et al. | 705/26.1 |

OTHER PUBLICATIONS

R. Elmasri and S. B. Navathe. Fundamentals of Database Systems (third edition). Addison-Wesley, New York, Jun. 2000, Title Pages, Preface, Sections 3.2-3.6, Sections 7.1-7.4 and Chapter 8, pp. iii, iv, vii-ix, 44-61, 195-225 and 243-288.*
R. Elmasri and S. B. Navathe. Fundamentals of Database Systems (third edition). Addison-Wesley, New York, Jun. 2000, Title Pages, Preface, Sections 3.3-3.6, Sections 7.1-7.4 and Chapter 8, pp. iii, iv, vii, viii, 45-61, 195-225 and 243-288.*
International Search Report from the European Patent Office for International Application No. PCT/EP2008/003509 (Mail date Jan. 28, 2009).
Bakos et al., "Phonebook Search Engine for Mobile P2P Social Networks", Proceedings "Database and Applications" Conference, pp. 210-215, (2005).

(Continued)

*Primary Examiner* — Greta Robinson
*Assistant Examiner* — Brian E. Weinrich
(74) *Attorney, Agent, or Firm* — Finnegan, Henderson, Farabow, Garrett & Dunner, L.L.P.

(57) ABSTRACT

A method for enabling a user of a communication network to get information about entities is presented. The entities are classified in an entity database according to a plurality of characteristics, and the user is associated with a list of contacts, each contact being associated with a log of communication sessions the contact has been involved in through the communication network. For each communication session the log includes an indication of parties involved in the communication session.

10 Claims, 4 Drawing Sheets

(56) References Cited

OTHER PUBLICATIONS

Sensage, Inc.: "Sensage Enterprise Security Analytics," pp. 1-2; XP002508258 Retrieved form the Internet: URL:http://www.sensage.com/English/Collaterals/Documents/SenSage_Soultions-Sheet_Telecommunications.pdf> [retrieved on Dec. 18, 2008] pp. 1-2, (Jun. 2006).

Patrick Van Eecke: "Scope and Impact of the European Data Retention Directive,", pp. 1-17, XP002508359; Retrieved from the Internet: URL:http://software.emc.com/microsites/application_portfolio/collateral/white_papers/SenSage_Data_Retention_White_Paper_June2006_.pfd> [retrieved on Dec. 18, 2008] (Jun. 2006).

* cited by examiner

METHOD AND SYSTEM FOR ENABLING A USER TO GET INFORMATION ABOUT ENTITIES OF PREDEFINED CATEGORIES

CROSS REFERENCE TO RELATED APPLICATION

This application is a national phase application based on PCT/2008/003509, filed Apr. 30, 2008, the content of which is incorporated herein by reference.

BACKGROUND OF THE INVENTION

1. Field of the Invention

The present invention relates to a method and system for enabling a user to get information about entities of predefined categories.

In particular, the present invention relates to a method and system for enabling a user to get information about entities of predefined categories, by using the social network of the user as a source of recommendation.

2. Description of the Related Art

A social network is a social structure made of nodes—which typically are individuals or organizations—that are tied by one or more specific types of relationships.

US 2005/0171799 states that a social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. Indirect personal relationships typically include relationships through first-degree relationships to people with whom a person has not had some form of direct contact. For example, a friend of a friend represents an indirect personal relationship. Such personal relationships can be utilized to find and develop relevant connections for a variety of objectives. US 2005/0171799 discloses a method to automatically recommend to the user a set of seed contacts that the user may employ to invite to join their social network.

US 2004/0181540 discloses a system and method whereby a user can learn of users with whom he/she is socially-related. This document states that this may be implemented by having nodes maintain logs relating to connections they have been involved in, and considering two users to have each met a third user when the node logs corresponding to those users each indicated connection with the node of the third user.

Bakos et al. ("Phonebook search engine for mobile p2p social networks", in Proceedings "Database and Applications" Conference 2005, pages 210-215) discloses a recommender system to answer questions like "I need a reliable plumber close to my house". According to the solution proposed by the Authors, each mobile phone will store a user profile and a contacts table. The user profile consists of three different types of data: personal data, professional information and interest. The contacts table corresponds to the standard address book data of the mobile phone. If a user wants to find a professional, he/she may introduce the desired query in his mobile phone (step 1). In the next phase (step 2) the mobile phone sends the query to predefined contacts of the contacts table and with a predetermined time to live (TTL). The mobile phones receiving the query check a match with their user profile (step 3). If there is a match, a query hit message is returned to the originator (step 5). In all cases, if the TTL is not expired, the query is forwarded to the contacts of this mobile phone (step 4). The query will reach all the phones within the range TTL of contacts of the originator and all query hits will be returned to it. Messages between mobile phones are transferred by using short messaging (SMS).

SUMMARY OF THE INVENTION

The Applicant notes that, in addition to the drawbacks mentioned by the same Authors at point 5 of the article about cost and speed, the search mechanism proposed by Bakos et al. has the drawback that only professionals loaded onto the contacts table of the originator or onto the contacts table of a contact of the originator can be found. Moreover, the reliability of the results depends on the veracity of the data stored by a user onto the user profile of his/her mobile phone. Therefore, the good functioning of the recommender system is in the user's hands.

The Applicant faced the problem of enabling a user to get information about entities meeting predetermined characteristics in an effective and reliable way.

Accordingly, in a first aspect, the invention relates to a method for enabling a user of a communication network to get information about entities, said entities being classified in an entity database according to a plurality of characteristics, the user being associated with a list of contacts, each contact being associated with a log of communication sessions the contact has been involved in through the communication network, for each communication session the log comprising an indication of parties involved in the communication session, the method comprising:

a) receiving from the user a request for entities meeting at least one characteristic of said plurality of characteristics;
b) retrieving at least part of the contacts of the contact list associated with the user;
c) retrieving the logs associated with the contacts retrieved in b);
d) accessing said entity database in order to check if there are entities meeting said at least one characteristic;
e) checking if among the entities that meet said at least one characteristic there is at least one entity that appears in at least one of the logs retrieved in c) as a communication session party;
f) in the affirmative case of e), sending to the user a reply comprising information about said at least one entity that appears in at least one of the logs retrieved in c) as a communication session party.

Accordingly, the method of the invention enables a user, looking for entities meeting at least one characteristic (e.g., belongingness to a predetermined business category), to identify—among the entities listed in an entity database (e.g., a Yellow Pages directory) that match the user request—those entities that have already been involved in a communication session with at least one contact of the user.

In this way, any entity that has been involved in a communication session with a contact of the user can be found, even if it is not loaded onto the contact list (e.g., address book) of the user's contact. The search capacity of the method of the invention is thus improved with respect to that of the recommender system disclosed in the above mentioned article by Bakos et al., wherein only professionals loaded onto the contact list of the user or onto the contact list of a contact of the user are found.

Moreover, as the entities are retrieved from the entity database, which can be a central database handled by a central operator, the reliability of the information returned to the user can be guaranteed. In particular, the reliability of the information provided to the user can be no longer in the user's hands as in the system disclosed in the above mentioned article by Bakos et al., wherein the reliability of the results instead depends on the veracity of the data stored by a user onto the user profile of his/her mobile phone.

In the present description and claims the wording:
- "session" with reference to two parties is used to indicate a signalling and/or data transmission from one of the two parties to the other one and/or vice versa, wherein the two parties can communicate with each other directly or through at least one intermediary;
- "communication session" is used to indicate a session established through a communication network. Examples of communication sessions include telephone calls, VoIP calls, chat sessions, virtual meetings, SMS/MMS (Short-Messaging-Service/Multimedia-Messaging-Service) messaging, e-mail messaging, fax messaging, instant messaging and similar;
- "context information" indicates any information that can be used to characterize the situation of an entity or user. For example, context information can include information on geographical position, habits, business commitments, working hours, calendar entries, location, opening and closing time, and similar.

Advantageously, e) is performed in the affirmative case of d).

Advantageously, in the entity database each entity is identified by at least one identifier.

Advantageously, in each log each party is identified by at least one identifier.

Advantageously, e) is performed by checking if among the entities that meet said at least one characteristic there is at least one entity that has at least one identifier comprised in at least one of the logs retrieved in c).

Advantageously, e) further comprises e') retrieving from the entity database at least one identifier of the at least one entity that appears in at least one of the logs retrieved in c) as a communication session party.

Advantageously, the information sent in f) comprises the at least one identifier retrieved in e').

The identifier may be a telephone number, an e-mail address, a network address, a messaging address, a SIP (Session Initiation Protocol) identifier, a VoIP (Voice over Internet Protocol) identifier, a web identifier representing the user and similar.

For each communication session the log advantageously further comprises an indication of date and time of the communication session and, optionally, the duration of the communication session.

Advantageously, the entities are suppliers (e.g., persons or structures) of goods and/or services.

Typical examples of entities are professionals (e.g., plumbers, painters, dentists, doctors, lawyers . . . ) and structures such as, for example, restaurants, travel agencies, hairdressers, swimming pools, schools, hospitals, banks, utilities businesses and similar.

Typically, in said entity database the entities are classified according to categories of goods and/or services provided by the entities. Advantageously, they are also classified according to the geographical position of the entities.

Advantageously, said plurality of characteristics comprises the belongingness to a category of goods and/or services provided by the entities. Advantageously, said plurality of characteristics also comprises the location in a predetermined geographical position.

According to an embodiment, in the affirmative case of e), the method further comprises obtaining current context information about the user and/or the at least one entity that appears in at least one of the logs retrieved in c) as a communication session party.

Advantageously, the method further comprises g) selecting, among the entities that appear in at least one of the logs retrieved in c), those entities that meet also predetermined conditions (e.g., entity availability and/or closeness to the user) based on the obtained current context information.

Advantageously, the user is associated with a log of communication sessions the user has been involved in, wherein for each communication session the log comprises an indication of the parties involved in the communication session. In this case, b) can be advantageously performed by retrieving the parties (other than the user) comprised in the log associated with the user.

The method advantageously further comprises receiving from the user a request for information about contacts linked to the at least one entity indicated in the reply of f). In this case, the method advantageously further comprises selecting, among the contacts retrieved in b), those contacts for which said at least one entity appears as a communication session party in the associated log. In this case, the method advantageously further comprises sending information about the selected contacts to the user. Advantageously, the information about the retrieved contacts comprises at least one identifier for each contact. Advantageously, the information about the retrieved contacts is sent to the user if an approval by the contacts is obtained.

In a second aspect, the invention relates to a network apparatus for enabling users of a communication network to get information about entities, said entities being classified in an entity database according to a plurality of characteristics, said network apparatus comprising:
- a contact list database wherein each user is associated with a list of contacts;
- a log database wherein each contact is associated with a log of communication sessions the contact has been involved in through the communication network, for each communication session the log comprising an indication of parties involved in the communication session; and
- modules that, at the receipt from one of the users of a request for entities that meet at least one characteristic of said plurality of characteristics, are adapted to:
  b) retrieve from the contact list database at least part of the contacts of the list associated with the user;
  c) retrieve from the log database the logs associated with the contacts retrieved in b);
  d) access the entity database in order to check if there are entities meeting the at least one characteristic specified in the user's request;
  e) check if among the entities that meet said at least one characteristic there is at least one entity that appears in at least one of the logs retrieved in c) as a communication session party;
  f) in the affirmative case of e), send to the user a reply comprising information about said at least one entity that appears in at least one of the logs retrieved in c) as a communication session party.

Advantageously, the network apparatus acts as information server.

As far as further features of this aspect of the invention are concerned, reference is made to what disclosed above with reference to the first aspect of the invention.

In a third aspect, the invention relates to a communication system comprising a central unit comprising an entity database wherein entities are classified according to a plurality of characteristics; a network apparatus according to the second aspect of the invention; and a plurality of user devices adapted to send to the network apparatus user requests for entities that meet at least one characteristic of said plurality of characteristics.

As far as further features of this aspect of the invention are concerned, reference is made to what disclosed above with reference to the first and second aspect of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
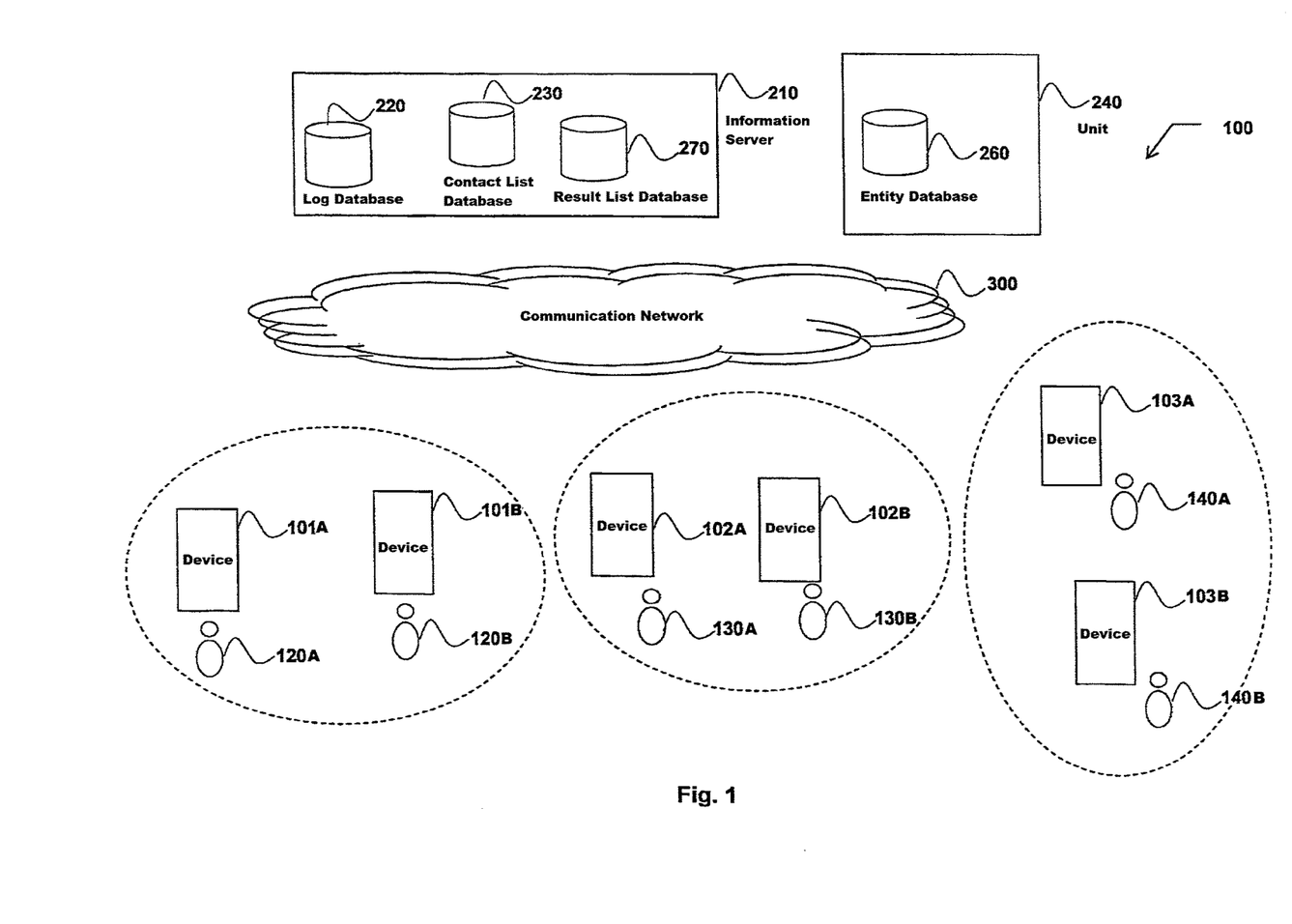
FIG. 1 schematically shows an embodiment of a communication system according to the invention.

FIG. 1 shows a communication system 100 according to an embodiment of the invention. According to this embodiment, the communication system 100 comprises a communication network 300, a network apparatus 210, a central unit 240 and a plurality of devices 101, 102, 103.

The network apparatus 210 advantageously acts as information server.

The devices 101, 102, 103 may be any device adapted to establish a communication session through the communication network 300.

Examples of devices 101, 102, 103 include mobile phones, cellular phones, fixed phones, softphones, Personal Computers, IP (Internet Protocol) photos, personal digital assistants (PDAs) and/or similar devices.

Examples of communication sessions include telephone calls, VoIP calls, chat sessions, virtual meetings, SMS/MMS messaging, e-mail messaging, fax messaging, instant messaging and similar.

Telephone calls may be established by using a traditional telephone device, a softphone for making telephone calls over the Internet, or any mobile terminal (e.g., a cellular phone, a smartphone, or any portable apparatus adapted to start and receive phone calls). Telephone calls can be established either through a circuit-switched telephone network or a packet-switched network.

The communication network 300 can comprise a mobile/fixed voice/data network such as the PSTN (Public Switched Telephone Network), the Internet, a circuit-switched telephone network, a packet-switched network, and/or similar. Links defined in the communication network 300 may comprise wireline links, or wireless links, or combination of wireline and wireless links.

In FIG. 1, by way of example, each device 101 is associated with a user 120, each device 102 is associated with a contact 130, and each device 103 is associated with an entity 140.

Even if only two user devices (e.g., 101A and 101B), two users (e.g., 120A and 120B), two contact devices (e.g., 102A and 102B), two contacts (e.g., 130A and 130B), two entity devices (e.g., 103A and 103B), and two entities (e.g., 140A and 140B) are depicted in FIG. 1, the communication system 100 typically comprises a large number of user devices, users, contact devices, contacts, entity devices end entities.

Moreover, even if not shown, the communication system 100 can comprise also more than one device associated with each user (e.g., 120A and 120B), contact (e.g., 130A and 130B) and/or entity (e.g., 140A and 140B).

Users (e.g., 120A and 120B) and contacts (e.g., 130A and 130B) are advantageously adapted to register themselves with the information server 210 in order to inform the information server 210 about their identity (e.g., name, surname and/or nickname) and about at least one identifier associated therewith.

In its turn, the information server 210 is adapted to store in a suitable database (not shown) the list of the plurality of users (e.g., 120A and 120B) and contacts (e.g., 130A and 130B) registered therewith, with the identity and identifier(s) thereof.

The identifier may be a telephone number, an e-mail address, a network address, a messaging address, a SIP identifier, a VoIP identifier, a web identifier representing the user and similar.

The information server 210 advantageously comprises a log database 220, a contact list database 230, and a result list database 270.

The log database 220 comprises communication session logs comprising information about communication sessions established by contacts (e.g., 130A and 130B) through the communication network 300.

Preferably, the log database 220 also comprises communication session logs comprising information about communication sessions established by users (e.g., 120A and 120B) through the communication network 300.

Advantageously, the information stored in the log database 220 concerns those communication sessions that have been established by contacts (e.g., 130A and 130B) and users (e.g., 120A and 120B) by using the identifier(s) registered at the information server 210.

Typically, for each communication session, the information comprised in the log database 220 includes an identifier of the party originating the communication session ("FROM" field), an identifier of the addressee party ("TO" field), day and time of the communication session and, optionally, the duration of the communication session.

The information comprised in the log database 220 is advantageously gathered through an information harvesting process that can be carried out locally (on the devices 101, 102) or centrally (e.g. by an operator of the communication network 300), or in both ways.

In any case, the gathered information is then periodically supplied (by devices 101, 102 or by the network operator) to the log database 220, which stores it. The log database 220 can therefore be supplied using the information locally stored on each device, or/and the information temporary stored in suitable network operator databases (not shown).

The contact list database 230 comprises a list of contacts (e.g., an address book) for each user 120. Advantageously, for each user 120, the contact list database 230 comprises at least one identifier for each contact of the list associated with the user 120.

The identifier may be a telephone number, an e-mail address, a network address, a messaging address, a SIP identifier, a VoIP identifier, a web identifier representing the user and similar.

The information comprised in the contact list database 230 can be periodically supplied to the contact list database 230 by the device(s) 101 associated with each user 120 (that, for example, may locally store (part of) the contact list thereon); or by an operator of the communication network 300 (that, for example, may centrally store (part of) the contact list on a suitable central network operator database, not shown), or in both ways.

It is also noted that, according to an embodiment, the contact list can also be inferred automatically (e.g., by the network operator or by a client application running on the devices (e.g., 101A and 101B)) without being explicitly defined by users (e.g., 120A and 120B). In fact, for each user 120, the contact list can be inferred by considering all (or part of) the parties, with the associated identifiers, that have been involved in a communication session with the user 120. In particular, each user's contact list can be inferred by analyzing the information contained in the communication session log, stored in the log database 220, associated with the user 120.

For example, each user's contact list can be inferred from the information recorded in the "FROM" and "TO" fields contained in the communication session log associated with the user. Moreover, relationship qualifiers (e.g., friend, colleague . . . ) for each user's contact can be inferred based on how many communication sessions and/or what type of communication sessions the user has established with each contact. In addition, also the duration of the communication sessions can be used to infer the relationship between each user and his/her contacts. For example, a large number of long communication sessions can imply close relationship.

When the communication session logs and the contact lists are locally stored on the devices (e.g., 101A, 101B, 102A, and 102B), the communication session log information and the contact list information stored therein can be periodically sent to databases 220 and 230, respectively, by means of a single o two different suitable client applications running on devices.

Even if not discussed in detail in the following, it is noted that the contact list database 230 may also comprise a contact list (e.g., an address book) for each contact 130 and, optionally, also for each entity 140.

As explained in more detail hereinafter, the result list database 270 temporarily stores the results of entity searches carried out by the information server 210 for users 120. For example, for each search carried out for a user 120, the result will comprise an identifier of such user 120, at least one identifier for each entity matching the user request and at least one identifier for each contact linked to the entities matching the user request.

The unit 240 comprises an entity database 260. Advantageously, the entity database 260 is managed by a central operator. According to another embodiment, the entity database 260 can be self-managed by users.

The entity database 260 comprises a classified list of entities.

Typically the entities are suppliers (e.g., persons or structures) of goods and/or services.

Typical examples of entities are professionals such as, for example, plumbers, painters, dentists, doctors, lawyers, and/or similar; and structures such as, for example, restaurants, travel agencies, hairdressers, swimming pools, schools, hospitals, banks, utilities businesses, and/or similar.

Advantageously, in the entity database 260 the entities are classified according to the category of good and/or service rendered. Moreover, the entities are advantageously classified also according to the geographical position thereof. For examples, they can be classified by countries, cities and, optionally, zip codes.

The entities classification may be either predefined by the central operator handling the entity database or freely defined by users with user defined tags.

A typical example of entity database 260 is represented by a Yellow Pages directory, which provides a listing of businesses classified according to the category of good and/or service rendered and the geographic area thereof.

The information server 210, devices 101 and 102, the communication network 300 and the unit 240 advantageously comprise hardware modules, software modules and/or combinations thereof adapted to implement the invention, according to the various aspects thereof.

Figure 2:
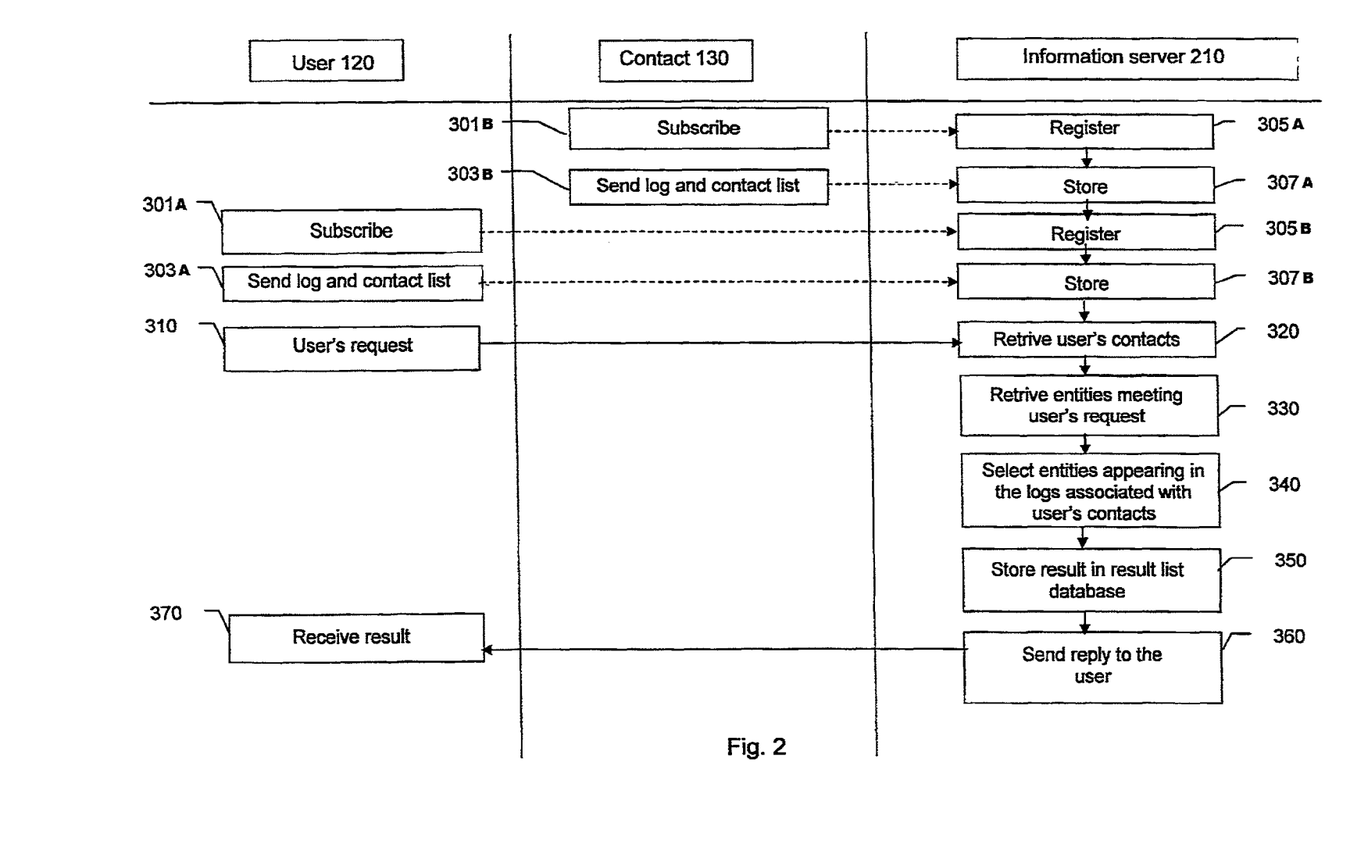
FIGS. 2 and 3 schematically show an example of the principal messages that can be exchanged between a user and a network apparatus and between a contact and a network apparatus, according to the invention.
Figure 3:
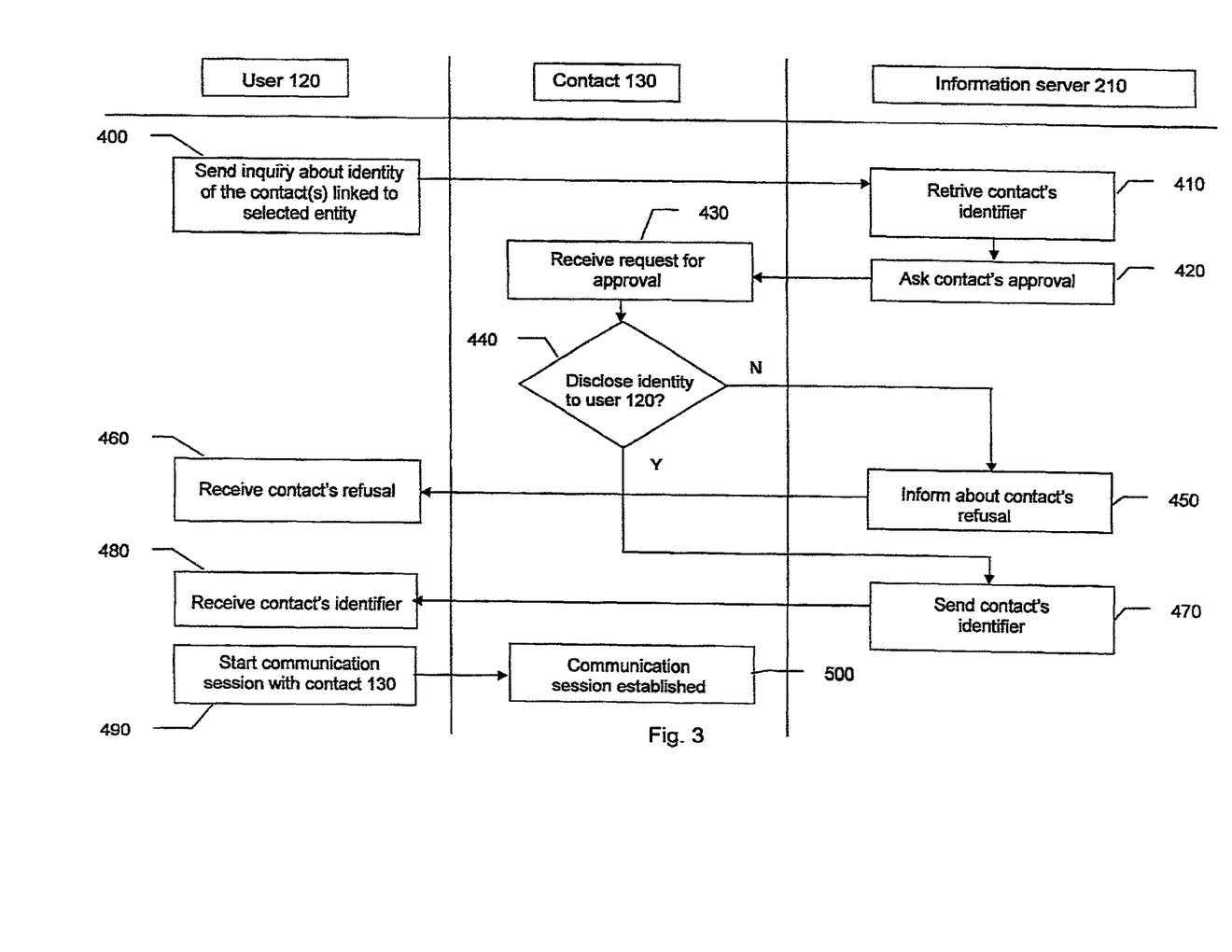

FIGS. 2 and 3 schematically show an example of the principal messages that can be exchanged between one of users 120 and the information server 210, and between one of the contacts 130 and the information server 210 in order to implement the invention.

In particular, in FIG. 2, at steps 301A and 301B user 120 and contact 130, respectively, send from the respective devices 101 and 102 a subscribe message to the information server 210 so as to be entitled to access services offered by the information server 210.

Advantageously, the subscribe message of user 120 and contact 130 comprises the indication of an identifier to be used by the information server 210 to send communications to them. The identifier may be a telephone number, an e-mail address, a network address, a messaging address, a SIP identifier, a VoIP identifier, a web identifier representing the user or similar.

According to an embodiment, the subscribe message of contact 130 can contain the indication of which users are allowed to access his/her communication session log (e.g. friends yes, colleagues no).

Moreover, according to an embodiment, the subscribe message of contact 130 can contain an indication of which users are allowed to get to know about his/her identifier.

At steps 305A and 305B, the information server 210 receives the subscribe message from the user 120 and contact 130, respectively, and locally stores the information contained in the subscribe message.

Once subscribed, user 120 and contact 120 periodically send the information server 210 (steps 303A and 303B, respectively) updated information relating to the contact list and communication session log associated therewith. It is noted that, when gathered centrally, said information will be periodically sent to the information server 210 by a network operator.

At steps 307A and 307B, the information server 210 receives said information from user 120 and contact 130, respectively, and suitably stores it in the contact list database 230 and communication session log database 220.

At step 310, user 120 sends from his/her device 101 a request to the information server 210 for information about entities meeting at least one characteristic.

For example, user 120 may send a request for information about entities belonging to a predetermined category of entities (e.g., plumbers).

Moreover, in addition to an indication of the category to be searched, the request at step 310 may also advantageously contain an indication of a specific geographical position (e.g., in term of country, city and, optionally, postal code).

Moreover, in addition to an indication of the category to be searched, the request at step 310 may also advantageously contain filtering conditions to be used to carry out the search. For example, the request may contain an indication of the contacts to be used to carry out the search (e.g., friends yes, colleagues no), a requirement to limit the search to entities that have been involved in a communication session with the user's contacts in the last n days (e.g., n=15), n months (e.g., n=6) or n years (e.g., n=2); or to the most contacted entities among those called by the user's contacts and/or similar.

Upon receiving the user request, at step 320 the information server 210 retrieves the contacts of the contact list associated with the user 120. As already mentioned above, said contacts can be retrieved from the contact list associated with user 120 in the contact list database 230 or can be inferred from the communication session log associated with the user 120. In this retrieval step, the filtering conditions possibly sent by user 120 in his/her request are advantageously used.

At step 330, the information server 210 accesses the entity database 260 in order to check if there is at least one entity meeting the characteristics (e.g., category of plumbers; location in Paris, postal code "xxxxx") requested by user 120.

At step 340, the information server 210 accesses the log database 220 to check if among the entities that match the user request there is at least one entity whose identifier(s) appears in any of the logs associated with the contacts of user 120, as retrieved at step 320.

In this way, among the entities of the entity database 260 that match the user request, only those that have been involved in a communication session with any of the contacts 130 of user 120 are selected.

The check at step 340 may result in an empty result list of entities or in a result list comprising any number of entities.

In the check at step 340, filtering conditions, if any, sent by user 120 in his/her request can be used to filter/sort the entities comprised in such result list.

At step 350, the information server 210 stores in the result list database 270 the result list obtained at step 340.

The result list advantageously comprises an identifier of the user 120 and, for each entity matching the user request, the identity and at least one identifier of the entity, and at least one identifier for each contact linked to the entity.

At step 360 the information server 210 sends a reply to the user 120 comprising information about the entities comprised in the result list. Such information advantageously comprises the identity (e.g., surname, name and/or nickname) and the identifier(s) (e.g., telephone number) of each entity and, optionally, a rank of the entities (e.g., in terms of the most recently entity contacted by anyone of the user's contacts, of the entity closest to the user position, or of the entity most contacted by anyone of the user's contacts).

The user 120 can access (step 307) the information received by the device 101 through any suitable user interface (e.g., through a voice and/or graphical interface).

Any communication between the devices 101, 102 and the information server 210 (e.g., the subscribe message, the user request message, the reply from the information server 210) can be established through a suitable client application running on devices 101 and 102, SMS messaging, IM (Instant Messaging), a telephone call, a web application, an interactive voice recognition application or interface, a text-to-speech application or interface, or similar.

Even if not shown, it is noted that the request sent from user 120 to the information server 210 and the reply sent from the information server 210 to user 120 can be sent by/to the same device 101 or by/to two different user devices 101, according to what specified by the user 120 at the subscription step 301. In this way, for example, the user 120 may send the request from his/her Personal Computer and receive the reply on his/her mobile phone.

It is further noted that the entities of the result list obtained at step 340 can be further filtered out according to inputs coming from a suitable context-aware system (not shown).

For example, depending on such inputs, an entity that at the moment is not available, or that is not in the user's nearby area can be eliminated from said list.

For example, the context-aware system will be adapted to determine, according to techniques known in the art, the real-time situation of an entity and/or user as far as concern, for example, the entity and/or user location, presence on a device, current usage of a device, entity and/or user's habits, business commitments, working hours, opening and closing time, calendar entries, and/or similar.

Inputs coming from a suitable context-aware system can be used by the information server 210 also to suggest the best currently available ranked entity, when the best ranked at all is currently busy. Also, entity location and user location may be useful to detect the closest (optionally, currently available) entity.

After accessing at step 370 the information contained in the result list, user 120 may decide to get in touch with the contact(s) (possibly more than one) linked with the entities comprised in the result list, so as to get more information about such entities (e.g., in terms of quality, prices, reliability, and similar).

In this case, as shown in FIG. 3, at step 400 the user can send to the information server 210 an inquiry about the contact(s) linked with one or more of the entities comprised in the result list.

At step 410 the information server 210 derives from the result list previously stored in the result list database 207 at least one identifier (e.g., a telephone number) of the contact(s) linked to the entity (or entities) specified in the user's inquiry and at step 420 asks the involved contact(s) for an approval to disclose its(their) identity to user 120.

At step 430, each of the involved contacts receives the request from the information server 210, on behalf of user 120.

A step 440 each of the involved contacts can decide to disclose his/her identity or not.

In the negative case, the information server 210 communicates (step 450) the contact's refusal to the user 120, which can access the received reply through a suitable (e.g., voice and/or graphical) user interface on the device 101 (step 460).

In the affirmative case, the information server 210 sends (step 470) to user 120 the identity (e.g., surname, name and/or nickname) and/or the identifier(s) of each involved contact.

At step 480 the user 120 access the received information through a suitable (e.g., voice and/or graphical) user interface on the device 101.

After having received the information, the user 120 can decide to establish a communication session with the (one of the) contact(s) to get more information about a desired entity 140 (steps 490 and 500) of those listed in the result list.

The communication session can be established through a telephone call, e-mail messaging, SMS messaging, IM, and/or similar.

It is noted that when, at step 301, the subscribe message of contacts 130 contains the indication of which users are allowed to get to know about his/her identifier, steps 420 to 440 may be replaced by a single step (not shown) wherein the information server 210 will look up in the information stored at the subscription step 301 to get to know if user 120 is allowed to get to know about the identifier of the contact(s) linked to the entity (or entities) specified in the user's inquiry.

It is further noted that in the above description distinct roles have been disclosed for users 120 (searching for entities), contacts 130 (listed in the contact lists of users 120) and entities 140 (offering goods and/or services and listed in the entity database 260). However, according to the invention, any of them can play multiple role being, for example, at the same time a user and a contact for another user; or an entity and a user and, optionally, also a contact for another user and/or similar.

In view of the above description of the invention, it will be clear that the invention provides a recommender system whereby a user, looking for predetermined professionals/businesses, is enabled to identify—among the professionals/businesses listed in an entity database (e.g., a Yellow Pages directory)—those professional/businesses that have already been involved in a communication session with at least one contact of the user.

Figure 4:
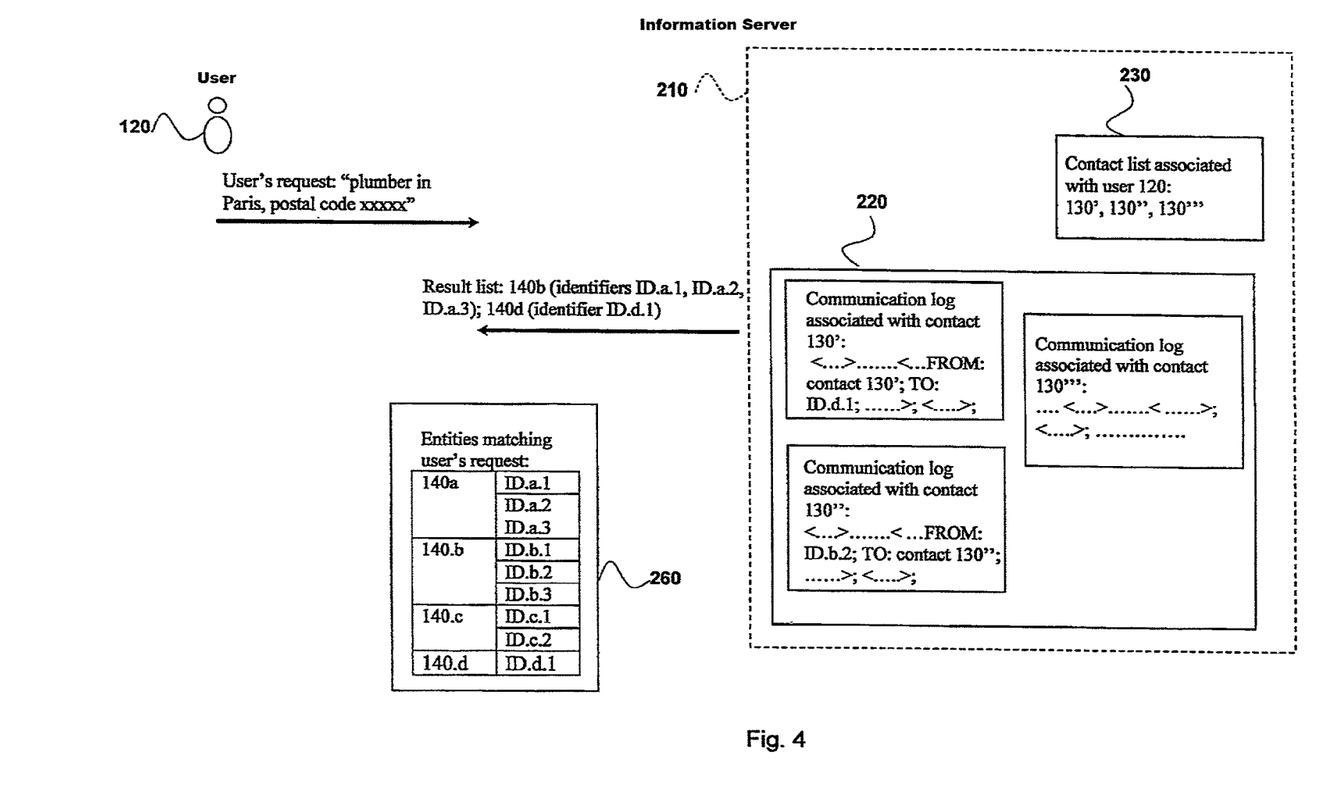
FIG. 4 schematically shows an exemplary implementation scenario of the invention.

For example, as schematically shown in FIG. 4, a user 120 looking for plumbers in Paris, postal code xxxxx, can send a specific request to the information server 210.

At the receipt of the user request, the information server 210 retrieves from the entity database 260 the entities matching the user request and from the contact list database 230 the contacts associated with the user 120. Moreover, the information server 210 retrieves from the log database 220 the communication sessions logs associated with the contacts retrieved from the contact list database 230.

In the example of FIG. 4, in the entity database 260 four entities 140a, 140b, 140c, 140d are matching the user request and in contact list database 230 three contacts 130', 130", 130'" are associated with user 120.

Moreover, in the entity database 260, entity 140a is associated with three identifiers ID.a.1, ID.a.2, ID.a.3 (e.g., mobile telephone number, fixed telephone number and e-mail address), entity 140b is associated with three identifiers ID.b.1, ID.b.2, ID.b.3 (e.g., first mobile telephone number, second mobile telephone number and fixed telephone number), entity 140c is associated with two identifiers ID.c.1, ID.c.2, (e.g., mobile telephone number and fixed telephone number), entity 140d is associated with one identifier ID.d.1 (e.g., mobile telephone number).

In the log database 220, entity 140b appears in the communication log associated with contact 130" and entity 140d appears in the communication log associated with contact 130'. In particular, the identifier ID.b.2 of entity 140b appears in the FROM field of a communication session recorded in the communication log associated with contact 130" and the identifier ID.d.1 of entity 140d appears in the TO field of a communication session recorded in the communication log associated with contact 130'.

Therefore, according to the invention, among entities 140a, 140b, 140c, 140d matching the user's request in the entity database 260, the information server 210 selects entities 140b and 140d, the identifier of which appears in the communication logs associated with the user's contacts 130', 130". Moreover, the information server 210 is adapted to send to the user 120 a result list comprising the identities of the entities 140b and 140d with the respective identifiers (ID.b.1, ID.b.2, ID.b.3 and ID.d.1), as retrieved from the entity database 260.

As the information (e.g., the identity and/or identifiers) about the entities returned to the user 120 is retrieved from the entity database 260, which can be a central database handled by a central operator, the reliability of the information returned to the user can be guaranteed. In particular, the reliability of the information provided to the user can be no longer in the user's hands as in the system disclosed in the above mentioned article by Bakos et al., wherein the reliability of the results instead depends on the veracity of the data stored by the user onto the user profile of the mobile phone.

Moreover, it is noted that according to the invention the entities retrieved from the entity database 260 are screened based on information retrieved in communication session logs associated with user's contacts. Therefore, any entity that has been involved in a communication session with a contact of the user is retrieved, including those not loaded onto the contact list (e.g., address book) of the contact. The search capacity of the recommender system according to the invention is thus improved with respect to that disclosed in the above mentioned article by Bakos et al., wherein only professionals loaded onto the contact list of the user or onto the contact list of a contact of the user can be found.

It is further noted that the contacts 130 are not operatively involved in the searching mechanism (see steps 320 to 350) of the invention. Therefore, differently from the system disclosed in the above mentioned article by Bakos et al., the invention has the advantage of not implying any cost for the user's contacts.

Moreover, according to the invention, the users are required to send their request to the information server 210 only. Therefore, differently from the system disclosed in the above mentioned article by Bakos et al., wherein the users are required to send their request to all (or part of) their contacts, the invention has the advantage of reducing the cost for the users.

Additionally, it is noted that according to the invention the speed of the searching mechanism merely depends on the CPU and/or other machine resources of the information server 210. Therefore, the invention is further advantageous with respect to the system disclosed in the above mentioned article by Bakos et al., wherein the searching speed instead depends on the average time taken by the SMS messages sent by the user and by the user's contacts to reach their destination and on the preset TTL.

Advantageously, the invention in the various aspect thereof can also provide a rewarding mechanism for stimulating users, contacts and entities to join the recommending system according to the invention. The rewarding system can, for example, be implemented through a repository for storing data about users, entities and contacts, and suitable software modules adapted to apply rewarding "credit-debit" rules.

For example, according to said rewarding rules:
when at the end of an overall recommendation process a user calls an entity XX recommended by a user's contact YY, a new credit can be added into the repository for use by contact YY, giving the right to have a discount from entity XX (e.g. contact YY, entity XX, +1 credit);
afterwards, when the contact YY calls the entity XX, he/she can take advantage of the discount from the entity XX (e.g., contact YY, entity XX, −1 credit→discount).

The invention claimed is:

1. A method for enabling a user of a communication network to get information about suppliers of goods or services, said suppliers being classified in an entity database according to categories of goods or services rendered, comprising:
    retrieving a contacts list associated with the user;
    including the contacts list in a contact list database;
    for each contact in the user's contacts list, creating a log of communication sessions involving that contact, each communication session log comprising an identifier of the party originating the communication session and an identifier of the party to which the communication session is addressed;
    receiving from the user a request for suppliers providing a given category of goods or services;
    retrieving at least part of the contacts of the contact list associated with the user;
    retrieving communication session logs associated with the retrieved contacts;

accessing said entity database in order to check if there are suppliers providing said given category of goods or services;

checking if, among the suppliers providing said given category of goods or services, there is at least one supplier that appears in at least one of the retrieved communication session logs; and when the checking is affirmative, sending to the user a reply comprising information about said at least one supplier that appears in at least one of the retrieved communication session logs.

2. The method according to claim 1, wherein, in the entity database, each supplier is identified by at least one identifier.

3. The method according to claim 2, wherein the checking is performed by checking if, among the suppliers providing said given category of goods or services, there is at least one supplier that has at least one identifier in at least one of the retrieved communication session logs.

4. The method according to claim 3, wherein the checking further comprises retrieving from the entity database at least one identifier of the at least one supplier that appears in at least one of the retrieved communication session logs.

5. The method according to claim 4, wherein the information sent comprises the at least one retrieved identifier.

6. The method according to claim 1, further comprising receiving from the user a request for information about contacts linked to the at least one supplier indicated in the reply.

7. The method according to claim 6, further comprising selecting, among the retrieved contacts, those contacts having corresponding communication session logs that contain at least one supplier providing said given category of goods or services.

8. The method according to claim 7, further comprising sending information about selected contacts to the user.

9. A network apparatus for enabling users of a communication network to get information about suppliers of goods or services, said suppliers being classified in an entity database according to categories of goods or services rendered, comprising:

a contact list database wherein each user is associated with a list of contacts;

a log database wherein each contact is associated with a log of communication sessions the contact has been involved in through the communication network, each communication session log comprising an identifier of the party originating the communication session and an identifier of the party to which the communication session is addressed; and modules that, at the receipt from one of the users of a request for suppliers providing a given category of goods or services, are configured to:

retrieve from the contact list database at least part of the contacts of the list associated with the user;

retrieve from the log database communication session logs associated with the retrieved contacts;

access the entity database in order to check if there are suppliers providing said given category of goods or services specified in the user's request;

check if, among the suppliers providing said given category of goods or services, there is at least one supplier that appears in at least one of the retrieved communication session logs; and when the checking is affirmative, send to the user a reply comprising information about said at least one supplier that appears in at least one of the retrieved communication session logs.

10. A non-transitory computer-readable medium comprising:

a central unit comprising an entity database wherein suppliers of goods or services are classified according to categories of goods or services rendered;

a network apparatus for enabling users to get information about the suppliers, comprising:

a contact list database wherein each user is associated with a list of contacts;

a log database wherein each contact is associated with a log of communication sessions the contact has been involved in, each communication session log comprising an identifier of the party originating the communication session and an identifier of the party to which the communication session is addressed; and modules that, at the receipt from one of the users of a request for suppliers providing a given category of goods or services, are configured to:

retrieve from the contact list database at least part of the contacts of the list associated with the user;

retrieve from the log database communication session logs associated with the retrieved contacts;

access the entity database in order to check if there are suppliers providing said given category of goods or services specified in the user's request;

check if, among the suppliers providing said given category of goods or services, there is at least one supplier that appears in at least one of the retrieved communication session logs; and when the checking is affirmative, send to the user a reply comprising information about said at least one supplier that appears in at least one of the retrieved communication session logs.

* * * * *